(12) United States Patent
Shimada

(10) Patent No.: US 6,621,588 B1
(45) Date of Patent: *Sep. 16, 2003

(54) OUTPUT CONTROL METHOD AND APPARATUS, AND OUTPUT SYSTEM

(75) Inventor: Muneki Shimada, Fuchu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/822,605

(22) Filed: Mar. 19, 1997

(30) Foreign Application Priority Data

Mar. 19, 1996 (JP) .............................. 8-062679

(51) Int. Cl.$^7$ .............................................. G06K 15/00
(52) U.S. Cl. ...................................... 358/1.15; 358/1.1
(58) Field of Search ................................. 395/114, 115, 395/100, 101, 162–166, 117, 501, 507, 144; 382/180, 234, 239, 244, 250; 358/426, 432, 433, 429, 534, 536, 524, 538, 456, 458, 448, 1.15, 1.1, 1.17

(56) References Cited

U.S. PATENT DOCUMENTS

| | | | | |
|---|---|---|---|---|
| 4,949,188 A | * | 8/1990 | Sato | 358/1.14 |
| 4,979,132 A | * | 12/1990 | Sugimoto | 358/3.14 |
| 5,309,254 A | * | 5/1994 | Kuwabara et al. | 358/3.21 |
| 5,321,532 A | * | 6/1994 | Ishikawa et al. | 358/534 |
| 5,465,165 A | * | 11/1995 | Tanio et al. | 358/448 |
| 5,671,341 A | * | 9/1997 | Kashiwazaki et al. | 395/112 |

FOREIGN PATENT DOCUMENTS

| | | |
|---|---|---|
| JP | 4-27273 A | 1/1992 |
| JP | 5-318840 | 12/1993 |
| JP | 6-205201 A | 7/1994 |
| JP | 7-123245 A | 5/1995 |
| JP | 7-170398 A | 7/1995 |
| JP | 7-195753 A | 8/1995 |
| JP | 7-314795 | 12/1995 |

* cited by examiner

Primary Examiner—Leo Boudreau
Assistant Examiner—Duy M. Dang
(74) Attorney, Agent, or Firm—Fitzpatrick, Cella, Harper & Scinto (57) ABSTRACT

A rendering area of a memory resource in the unit of a band to be used by print information written in a predetermined page description language is suppressed as much as possible from not being reserved in the memory resource. A rendering process in the unit of a band can be executed as many times as possible to obtain a high quality print. The print information is converted into intermediate language data for each data type judged by a CPU. CPU also judged whether the total capacity of the converted intermediate language data exceeds a capacity set to a management RAM to control switching between rendering process modes used by a hardware renderer.

14 Claims, 3 Drawing Sheets

OUTPUT CONTROL METHOD AND APPARATUS, AND OUTPUT SYSTEM

BACKGROUND OF THE INVENTION

1. Field of the Invention

The present invention relates to a print control apparatus for processing print information written in a predetermined page description language by rendering the print information on a memory on a band unit basis, a data processing method for the print control apparatus, and a storage medium storing computer readable programs of the data processing method.

2. Related Background Art

There are a variety of applications which can be processed by an information processing apparatus such as a host computer. Such applications include computer aided design (CAD), computer graphics (CG), design, desk top publishing (DTP) in business, and multimedia. Data processed by such applications is output from a printer capable of printing data with high precision.

In processing print information requested by such applications, the printer analyzes page description language (PDL) data transmitted from a host computer, renders the data of one page on a full-paint memory, and print it out on a recording sheet.

In order to meet a need for saving the capacity of a memory, a rendering method through band control (hereinafter called a band process) has been used widely, in which print information is rendered on a small band memory at high resolution synchronously with a paper feed of a printer.

With this band process, received PDL data is classified into various types of data such as a character, line, polygon and image, and after the print data of one page is stored in the form of intermediate language (objects) containing, for example, rendering positions and information on bands to be rendered, it is printed out at high resolution.

If a memory for storing objects becomes full before all objects of one page are stored therein or if a prediction rendering time for rendering a specific band does not follow a paper eject speed, the operation mode is automatically changed to a full-paint mode of rendering the entire of one page in a memory. In this full-paint mode, the objects already stored are sequentially rendered at low resolution starting from the object of the first band. The object which was rendered and is now unnecessary is deleted from the memory. The space of this empty memory is assigned to the full memory to obtain the memory capacity of one page. After the data of one page is rendered, it is printed out on a recording sheet. This process of executing the full-paint mode at low resolution is called hereinafter a "degrade process".

If image data requiring a large capacity of a memory is supplied to a conventional printer, it is judged as memory-full and the full-paint mode is executed. However, in this full-paint mode, objects of characters and lines not directly related to the image data which consumes the memory are printed also at low resolution so that the performance of a print engine cannot be fully utilized.

If image objects are images binarized through error diffusion and are output at low resolution in the full-paint mode or output in a reduced size in response to a PDL data instruction at a low resolution, then the quality of images are greatly degraded.

SUMMARY OF THE INVENTION

The present invention has been made to solve the above problems. It is an object of the present invention to provide a print control apparatus wherein the data type of input print information written with a page description language is judged, and the print information is converted into intermediate language data while reducing the print information which occupies a large capacity of a memory resource, so that a rendering area of the memory resource in the unit of a band to be used by the print information is suppressed as much as possible from not being reserved frequently in the memory resource and that a rendering process in the unit of a band can be executed as many times as possible to obtain a high quality print. The invention also provides a data processing method for the print control apparatus and a storage medium storing programs readable by a computer.

A print control apparatus according to a first aspect of the invention comprises: judging means for judging the data type of print information by analyzing the print information which is written with a predetermined page description language and input via a predetermined communication medium from an information processing apparatus; converting means for converting the print information into different intermediate language data for each data type judged by the judging means; storage means for storing the intermediate language data converted by the converting means; rendering means for rendering the intermediate language data stored in the storage means into predetermined print data; and control means for switching between rendering modes to be executed by the rendering means, through judgements of whether the total capacity of the intermediate language data converted by the converting means exceeds a set capacity occupied by the storage means.

According to a second aspect of the invention, if the judging means judges that the data type of the input print information written with the predetermined page description language is image information, the converting means converts the image data in the print information into the intermediate language data after reducing the image information.

According to a third aspect of the invention, if the total capacity of the intermediate language data exceeds the set capacity, the control means causes the rendering means to render the intermediate language data in the unit of a page.

According to a fourth aspect of the present invention, if the total capacity of the intermediate language data does not exceed the set capacity, the control means causes the rendering means to render the intermediate language data in the unit of a predetermined band width.

According to a fifth aspect of the present invention, if the control means causes the rendering means to render the intermediate language data in the unit of a page, the rendering means renders after enlarging the intermediate language data reduced by the converting means.

According to a sixth aspect of the present invention, the converting means converts image information in the print information binarized through error diffusion into multi-value image data, changes the multivalue image data to low resolution, binarizes the multivalue image data of low resolution, and converts the binarized multivalue image data into the intermediate language data.

According to a seventh aspect of the present invention, upon a request of a reduction print of the input print information written with the predetermined page description language, the converting means converts image information in the print information binarized through error diffusion into multivalue image data, changes the multivalue image data to low resolution, binarizes the multivalue image data of low resolution, and converts the binarized multivalue image data into the intermediate language data.

A data processing method, according to an eighth aspect of the present invention, for a print control apparatus which analyzes print information written with a predetermined page description language and input via a predetermined communication medium from an information processing apparatus, comprises: a judging step of judging the data type of the print information; a reducing step of, if the data type of the print information is judged as image information, reducing the image information; a converting step of converting the reduced print information or the input print information into predetermined intermediate language data; a judging step of judging whether the total capacity of the converted intermediate language data exceeds a set capacity occupied by a rendering memory; a first rendering step of rendering the converted intermediate language data into print data in the unit of a page in accordance with the judgement results; and a second rendering step of rendering the converted intermediate language data into print data in the unit of a predetermined band width in accordance with the judgement results.

According to a ninth aspect of the present invention, if the image information is information binarized through error diffusion, the reducing step converts the binarized image information into multivalue image data, changes the multivalue image data to low resolution, and binarizes the multivalue image data of low resolution.

According to a tenth aspect of the present invention, a medium storing a computer readable program is provided, the program comprising: a judging step of judging the data type of the print information; a reducing step of, if the data type of the print information is judged as image information, reducing the image information; a converting step of converting the reduced print information or the input print information into predetermined intermediate language data; a judging step of judging whether the total capacity of the converted intermediate language data exceeds a set capacity occupied by a rendering memory; a first rendering step of rendering the converted intermediate language data into print data in the unit of a page in accordance with the judgement results; and a second rendering step of rendering the converted intermediate language data into print data in the unit of a predetermined band width in accordance with the judgement results.

DETAILED DESCRIPTION OF THE PREFERRED EMBODIMENTS

Embodiments of the invention will be described in detail with reference to the accompanying drawings.

First Embodiment

Figure 1:
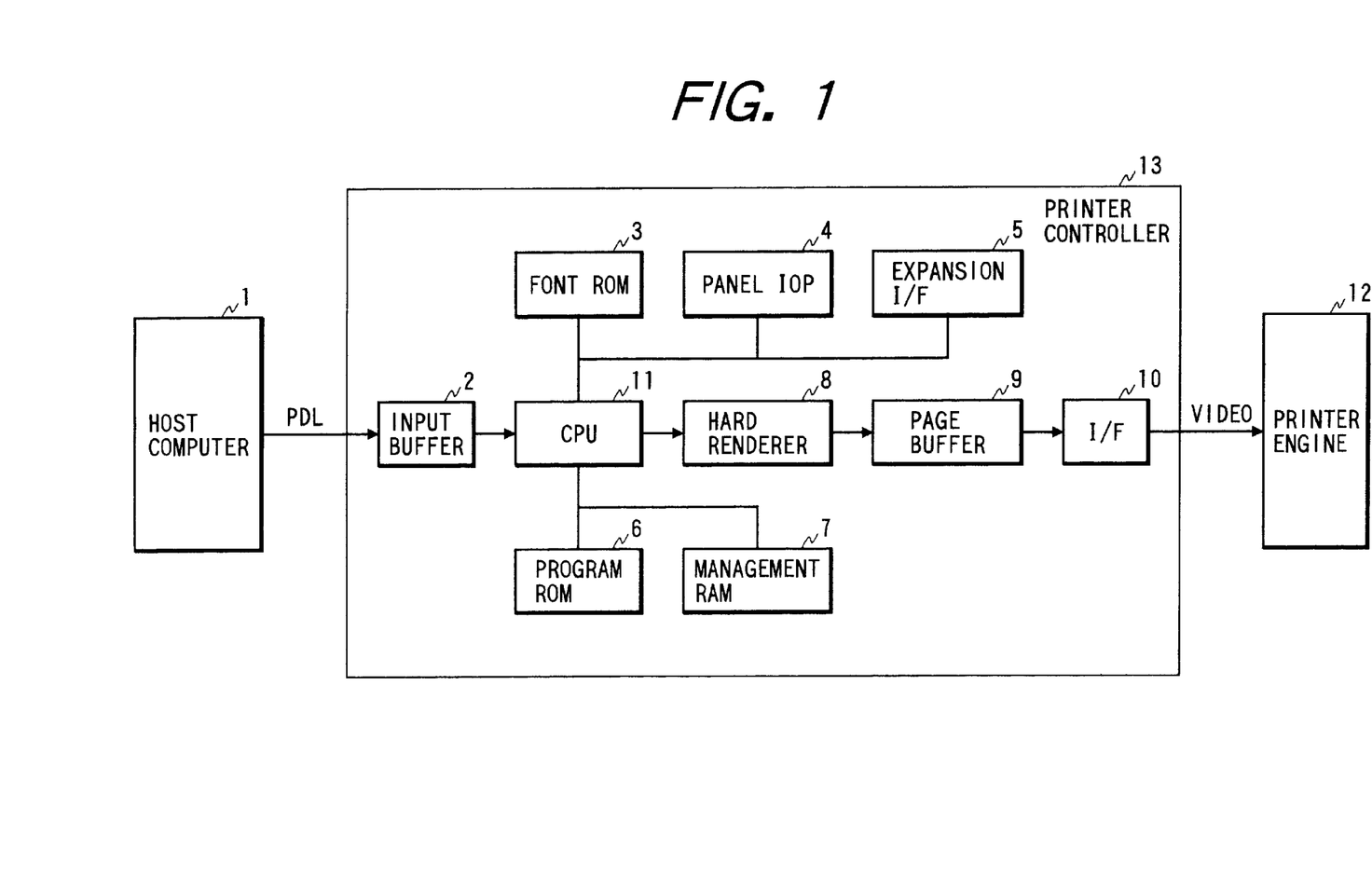
FIG. 1 is a block diagram showing the structure of a printer applicable to a print control apparatus according to a first embodiment of the invention.

FIG. 1 is a block diagram showing the structure of a printer applicable to a print control apparatus according to a first embodiment of the invention.

Referring to FIG. 1, reference numeral 1 represents a host computer such as a work station. The host computer 1 generates print information by using application software, converts it into print data of a PDL format (PostScript, LIPS, CaPSL, and etc. (registered trademarks)), and transmits PDL data to a printer controller 13. PDL data is transferred between the host computer 1 and a printer. This communications may be serial communications, network communications, or bus connection communications. A high speed communication line is preferable for high communications performance.

In the printer controller 13, reference numeral 2 represents an input buffer which stores PDL data transmitted from the host computer 1. The input data in the buffer 2 is scanned by a PDL command analysis program stored in a program ROM 6.

Reference numeral 3 represents a font ROM which stores therein character bit patterns, outline information, character base line information and character metric information and is used when characters are printed. Reference numeral 4 represents a panel IO processor (IOP) which is an IO processor or firmware for detecting a switch input of a panel mounted on the printer main body and controlling to display information on an LCD. This panel IOP is made of an inexpensive CPU.

Reference numeral 5 represents an extended interface (I/F) unit which is used as an interface circuit with an extended module of the printer (font ROM, program ROM, RAM, hard disk). Reference numeral 6 represents a program ROM which stores therein programs (for the procedures illustrated by the flow charts shown in FIGS. 2 and 3 and other control procedures to be described later). CPU 11 reads these programs and execute them. Reference numeral 7 represents a management RAM which is used as a working area of programs and stores therein data of the intermediate data format (objects) obtained by analyzing and converting the input PDL data, and global information, at predetermined storage areas thereof.

Reference numeral 8 represents a hardware renderer which performs a rendering process in real time by using ASIC hardware, synchronously with video transfer to a printer engine 12 (laser beam printer LBP). This hardware renderer 8 can execute the band process with a small memory capacity.

Reference numeral 9 represents a page buffer which stores an image developed from PDL language data and is constituted of a memory having at least two bands for the band process. The capacity of this memory is page width×band height of about 256 or 512. If the band process is impossible and if the printer is a laser beam printer which transfers images synchronously with the printer engine timing, this memory is constituted of a full bit map memory with low resolution.

Reference numeral 10 represents a printer interface (I/F) unit which transfers video information in the page buffer 9 to the printer engine 12, synchronously with the horizontal and vertical sync signals of the printer. A command to the printer or a status signal from the printer is transmitted via this interface unit.

CPU 11 serves as an arithmetic and logic unit for controlling the whole of the printer controller 13. The printer engine 12 prints out video signals supplied from the printer controller 13 and can print at a plurality of resolutions.

The print control apparatus according to the first aspect of the invention comprises: judging means (CPU 11 judges by executing a control program stored in the program ROM 6 or a control program stored in an unrepresented external memory (such as a memory card)) for judging the data type of print information by analyzing the print information which is written with a predetermined page description language and input via a predetermined communication medium (such as interface, infrared radio interface, network interface) from an information processing apparatus (host computer 1); converting means (CPU 11 judges by executing a control program stored in the program ROM 6 or a control program stored in an unrepresented external memory (such as a memory card)) for converting the print information into different intermediate language data for each data type judged by the judging means; storage means (management RAM 7) for storing the intermediate language data converted by the converting means; rendering means (hardware renderer 8) for rendering the intermediate language data stored in the storage means into predetermined print data; and control means (CPU 11 judges by executing a control program stored in the program ROM 6 or a control program stored in an unrepresented external memory (such as a memory card)) for switching between rendering modes to be executed by the rendering means, through judgements of whether the total capacity of the intermediate language data converted by the converting means exceeds a set capacity occupied by the storage means (management RAM 7). The rendering process mode for the hardware renderer 8 is selected by judging whether the total capacity of the intermediate language data converted from the print information for each data type judged by CPU 11 exceeds the set capacity occupied by the management RAM 7, and the intermediate language data having a difference data amount is generated in accordance with the data type of the print information. Accordingly, it is possible to render the intermediate language data into print data in an optimum rendering process mode.

According to the second aspect of the invention, if CPU 11 judges that the data type of the input print information written in the predetermined page description language is image information, the converting means converts the image data in the print information into the intermediate language data after reducing the image information. Therefore, if the print information is image information, the total capacity of the intermediate language data of one page can be reduced.

According to the third aspect of the invention, if the total capacity of the intermediate language data exceeds the set capacity, CPU 11 causes the rendering hardware renderer 8 to render the intermediate language data in the unit of a page. If the capacity of reduced intermediate data is still large, a page paint mode is used.

According to the fourth aspect of the present invention, if the total capacity of the intermediate language data does not exceed the set capacity, CPU 11 causes the hardware renderer 8 to render the intermediate language data in the unit of a predetermined band width. If the capacity of the reduced intermediate data is sufficiently small, the band rendering mode is used.

According to the fifth aspect of the present invention, if CPU 11 causes the hardware renderer 8 to render the intermediate language data in the unit of a page, the hardware renderer 8 renders after enlarging the intermediate language data reduced by the converting means. Since the capacity of the storage means for storing image information can be reduced, a sufficient development capacity can be reserved in the storage means.

According to the sixth aspect of the present invention, CPU 11 converts image information in the print information binarized through error diffusion into multivalue image data, changes the multivalue image data to low resolution, binarizes the multivalue image data of low resolution, and converts the binarized multivalue image data into the intermediate language data. It is therefore possible to suppress the quality of image information binarized through error diffusion from being degraded, as much as possible.

According to the seventh aspect of the present invention, upon a request of a reduction print of the input print information written with the predetermined page description language, the converting means converts image information in the print information binarized through error diffusion into multivalue image data, changes the multivalue image data to low resolution, binarizes the multivalue image data of low resolution, and converts the binarized multivalue image data into the intermediate language data. It is therefore possible to suppress the quality of image information binarized through error diffusion from being degraded during the reduction rendering.

A data processing method for the print control apparatus according to the invention will be described with reference to the flow chart shown in FIG. 2.

Figure 2:
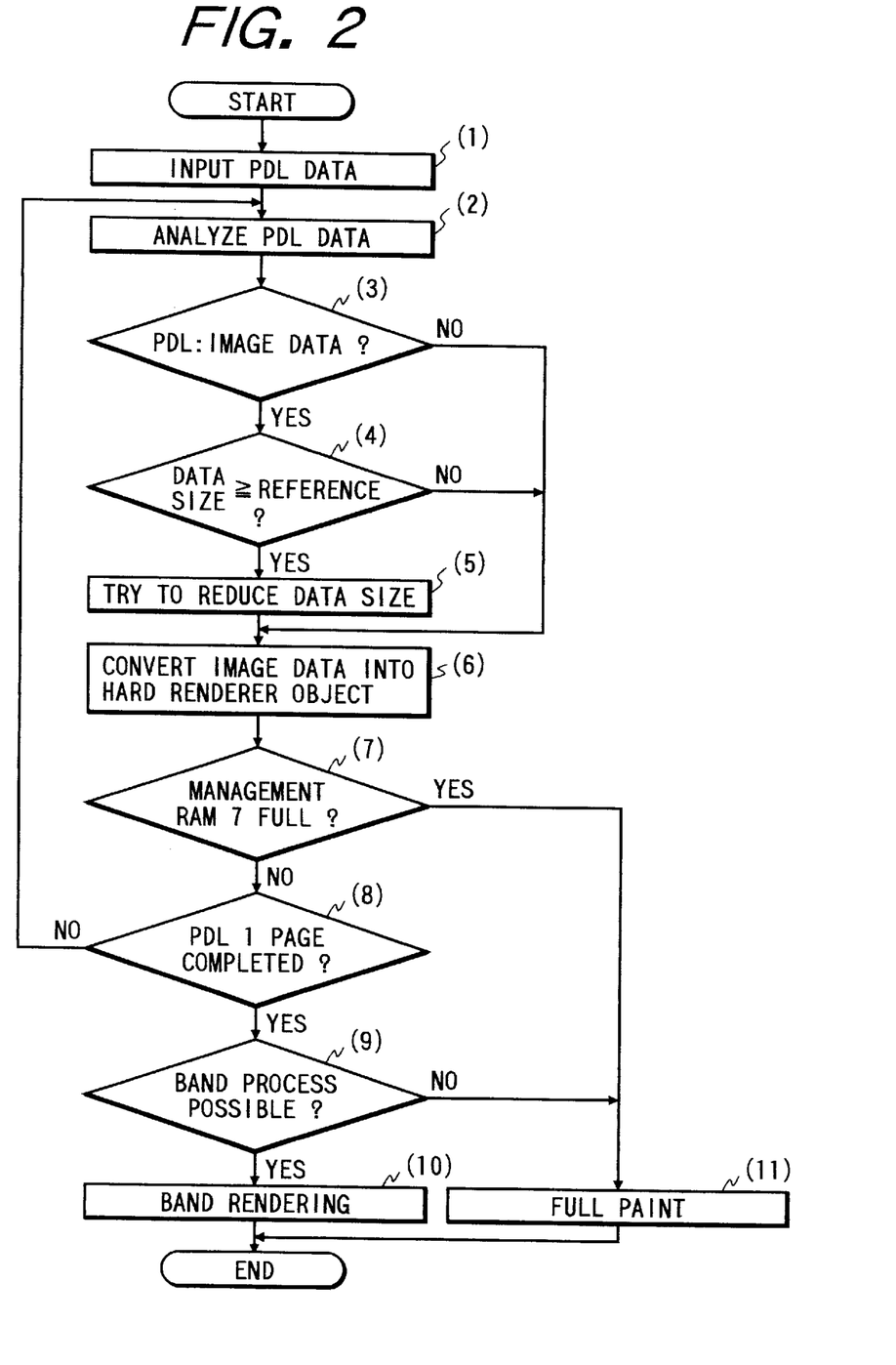
FIG. 2 is a flow chart illustrating the operation of a data processing method for the print control apparatus according to the first embodiment of the invention.

FIG. 2 is a flow chart illustrating the operation of a data processing method for the print control apparatus according to the first embodiment of the invention. Numerals with parenthesis (1) to (11) represent Steps.

First, the input buffer 2 receives a PDL code from the host computer 1 (Step (1)), the received PDL code is analyzed in accordance with a language specification (Step (2)), CPU 11 judges whether the PDL data is image data (Step (3)), and if it is judged as the image data, CPU 11 judges whether the image data occupies the management RAM 7 greater than a certain reference value (Step (4)), whereas if it does not occupy greater than the certain reference value, the image data is converted into the object format and stored in the management RAM 7 (Step (6)).

Figure 3:
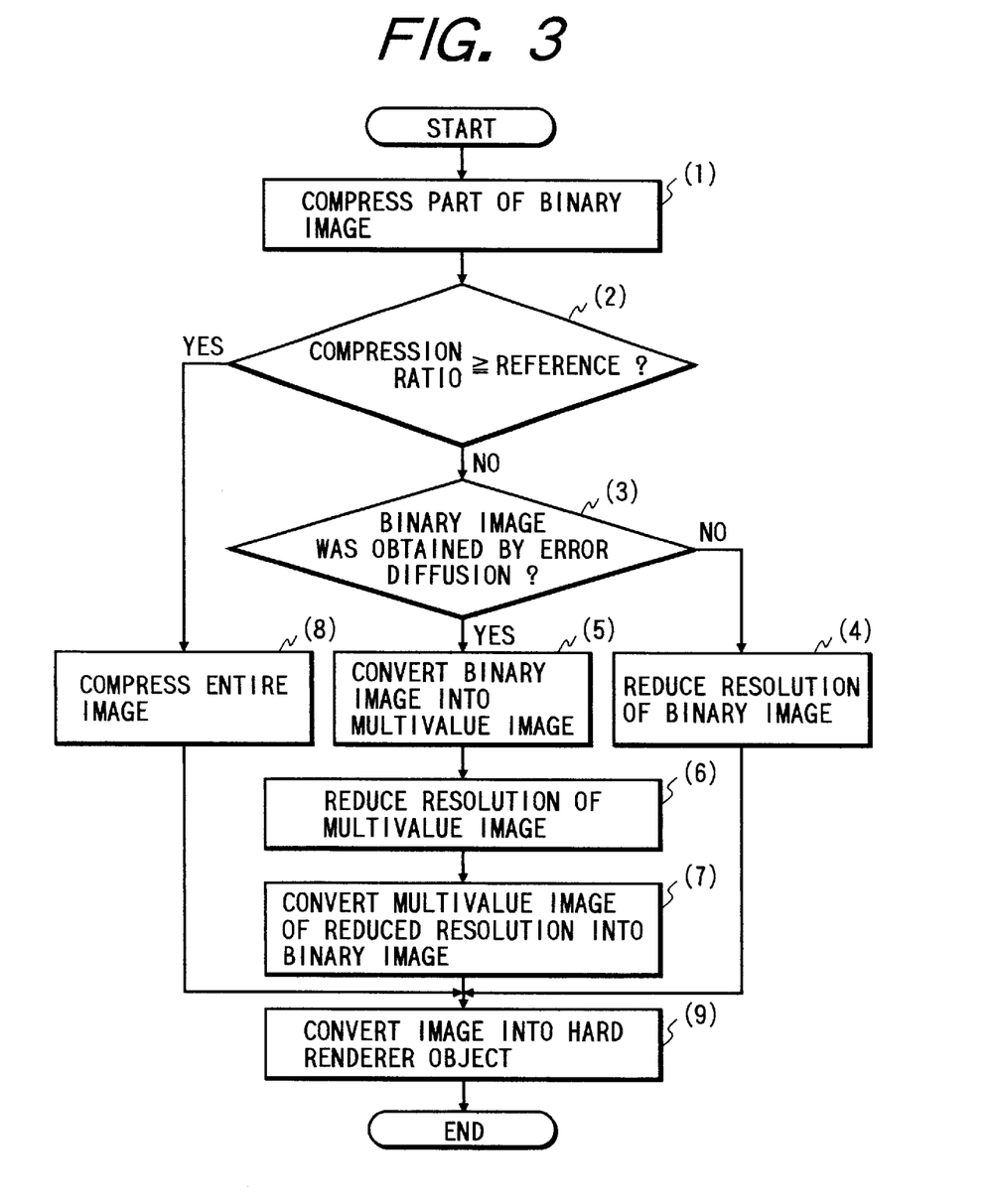
FIG. 3 is a flow chart illustrating the operation of an image size reduction process shown in FIG. 2.

If it is judged at Step (4) that the image data occupies greater than the certain reference value, the image data is compressed and subjected to a low resolution process illustrated in FIG. 3 to save the memory capacity (Step (5)). With this process, the memory size of the image data can be reduced and the capacity of the management RAM 7 can be saved.

If the PDL data is judged at Step (3) that it is not image data but general character or figure data, the PDL data is converted into the object format supported by the hardware renderer 8 or software renderer stored in the program ROM 6, and stored in the management RAM 7 (Step (6)).

It is then judged whether the management RAM 7 is full (Step (7)). If full, the flow advances to Step (11), and a full paint mode is selected to execute a full paint process on the management RAM 7 to terminate the procedure.

If it is judged at Step (7) that the management RAM 7 is not full, CPU 11 judges whether PDL codes of one page have been processed (Step (8)). If not, the flow returns to Step (2), whereas if processed (if all data have been stored), CPU 11 judges whether the band process is possible (Step (9)). If not, the flow advances to Step (11), whereas if possible, the band process starts and the data in the memory is rendered (Step (10)). In this case, if the data in the memory is image data subjected to the low resolution process at Step (5), the image data is enlarged to the actual size and rendered at Step (10).

FIG. 3 is a flow chart illustrating an example of the image size reducing process shown in FIG. 2. (1) to (9) represent Steps.

First, part of a binary image whose size is to be reduced is compressed (Step (1)). This process is performed in order to judge whether the image can be compressed at a high compression ratio. Compression algorithms suitable for each image type are used. For example, run-length coding and JBIG for binary images and JPEG for multivalue images are used.

Next, CPU 11 judges whether the compression results indicate a compression ratio higher than a reference value (Step (2)). If it is judged that a compression ratio higher than the reference value can be obtained, the entirety of the image is compressed (Step (8)), converted into hardware renderer objects (Step (9)), and stored in the management RAM 7 (Step (9)).

If it is judged at Step (2) as a compression ratio lower than the reference value, CPU 11 judges whether the image is an image binarized through error diffusion (Step (3)). This judgement may be conducted by affixing a flag representative of the image type to the image in the PDL data.

If it is judged at Step (3) that the image is not an image binarized through error diffusion, the binary image itself is subjected to a low resolution process (Step (4)) because the image quality is not degraded so much by this low resolution process, and thereafter the flow advances to Step (9). This low resolution process may be conducted by simply deriving sample points from the image or by a PRES method which is part of the binary image compression JBIG and can provide a better image quality. The image subjected to the low resolution process is converted into hardware renderer objects.

If it is judged at Step (3) that the input image is an image binarized through error diffusion and the image is subjected to the low resolution process, the image quality is greatly degraded as compared to the original image.

In order to avoid a low image quality, all pixels of the binary image are scanned and each pixel (0 or 1) is converted into a multivalue pixel by using a sum of weighted peripheral pixels of each pixel (Step (5)). This process is performed for all pixels to convert the binary image into a multivalue image. Next, the multivalue image is subjected to the low resolution process (Step (6)). This low resolution process is conducted by scanning all pixels of the multivalue image and using a sum of weighted peripheral pixels of each pixel as the pixel value of a corresponding pixel of the resolution reduced multivalue image. The resolution is determined depending upon a selection of a plurality of pixels and upon a weighing method.

Next, the low resolution multivalue image is binarized through dithering or error diffusion (Step (7)). With these processes, an image binarized through error diffusion, which has otherwise a low compression ratio and is difficult to lower its resolution, can be reduced in its resolution and image size while maintaining a good image quality.

According to the eighth aspect of the present invention, the data processing method, illustrated in the flow charts of FIGS. 2 and 3, for a print control apparatus which analyzes print information written with a predetermined page description language and input via a predetermined communication medium (such as an interface, infrared radio interface, network interface) from an information processing apparatus (host computer 1), comprises: a judging step (Steps (2) and (3) in FIG. 2) of judging the data type of the print information; a reducing step (Steps (4) and (5) in FIG. 2) of, if the data type of the print information is judged as image information, reducing the image information; a converting step (Step (6) in FIG. 2) of converting the reduced print information or the input print information into predetermined intermediate language data; a judging step (Step (9) in FIG. 2) of judging whether the total capacity of the converted intermediate language data exceeds a set capacity occupied by a rendering memory; a first rendering step (Step (11) in FIG. 2) of rendering the converted intermediate language data into print data in the unit of a page in accordance with the judgement results; and a second rendering step (Step (10) in FIG. 2) of rendering the converted intermediate language data into print data in the unit of a predetermined band width in accordance with the judgement results. It is therefore possible to generate intermediate language data having a different data amount in accordance with the data type of print information and render the intermediate language data into print data in an optimum rendering mode.

According to the ninth aspect of the present invention, if the image information is information binarized through error diffusion, the reducing step (Steps (1) to (9) in FIG. 3) converts the binarized image information into multivalue image data, changes the multivalue image data to low resolution, and binarizes the multivalue image data of low resolution. It is therefore possible to suppress the quality of an image binarized through error diffusion from being degraded during rendering.

According to the tenth aspect of the present invention, a medium storing a computer readable program is provided, the program comprising: a judging step (Steps (2) and (3) in FIG. 2) of judging the data type of the print information; a reducing step (Steps (4) and (5) in FIG. 3) of, if the data type of the print information is judged as image information, reducing the image information; a converting step (Step (6) in FIG. 2) of converting the reduced print information or the input print information into predetermined intermediate language data; a judging step (Step (9) in FIG. 2) of judging whether the total capacity of the converted intermediate language data exceeds a set capacity occupied by a rendering memory; a first rendering step (Step (11) in FIG. 2) of rendering the converted intermediate language data into print data in the unit of a page in accordance with the judgement results; and a second rendering step (Step (10) in FIG. 2) of rendering the converted intermediate language data into print data in the unit of a predetermined band width in accordance with the judgement results. Namely, the program codes corresponding to Steps of FIGS. 2 and 3 are stored in an external storage medium or an internal storage resource, and CPU 11 reads and executes the program codes stored in the storage. The invention also covers this embodiment.

Second Embodiment

In the above embodiment, in the degrade process at Step (11) shown in FIG. 2, an image binarized through error diffusion is converted into a low resolution image in the full paint mode. In this case, the above-described low resolution processes may be used so that a page having a relatively good image quality and a low resolution can be obtained even during the degrade process.

Third Embodiment

In reducing an image binarized through error diffusion and written with PDL and outputting on a page, the above-described low resolution processes may be used. It is therefore possible to generate a reduced image having a good quality.

In each of the above embodiments, image data consuming a large capacity of the memory is compressed and stored. The image data is band rendered while expanding it. In this manner, the capacity of the memory can be saved and the full paint mode at a low resolution can be suppressed as much as possible.

If the compression ratio of the image to be reduced is small, the image is subjected to the low resolution process to save the memory. For the band rendering, the low resolution image is enlarged to the original size and output. In this manner, although the image quality of a page is degraded, the full paint mode having a low resolution of a page as a whole can be suppressed.

An image binarized through error diffusion whose quality is greatly degraded by the low resolution process is first converted into a multivalue image, and the multivalue image itself is subjected to the low resolution process. The low resolution multivalue image is binarized to obtain a binary image having a low resolution. In this manner, the image binarized through error diffusion can be converted into a low resolution image without largely degrading the image quality.

The scope of the invention also includes a system or apparatus whose computer (CPU or MPU) reads and executes software program codes realizing the functions of the above embodiment and stored in a storage medium.

In this case, the software program codes themselves read from the storage medium realize the novel functions of this invention. Therefore, the storage medium storing the program code constitutes the present invention.

The storage medium storing such program codes may be a floppy disk, a hard disk, an optical disk, a magnetooptical disk, a CD-ROM, a CD-R, a magnetic tape, a non-volatile memory card, a ROM and an EEPROM. In this case, it is obvious that index information for calling a necessary program module is integrally or separately stored in the storage medium.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

The present invention may be applied to a system constituted by a plurality of apparatuses or to a system constituted by a single apparatus. Obviously, the scope of the invention also includes a system or apparatus which is provided with software program codes so as to realize the functions of the above embodiments. In this case, the system or apparatus can have the advantageous effects of the invention by reading the software programs stored in a storage medium.

The system or apparatus can have the advantageous effects of the invention by downloading the software programs from a database on a network by using communication programs.

As described so far, according to the first aspect of the invention, the control means causes the rendering means to switch between the rendering process modes, by judging whether the total capacity of the intermediate language data converted by the converting means from the print information for each data type judged by the judging means exceeds the set capacity. Accordingly, it is possible to generate intermediate language data having a different data amount in accordance with the data type of the print information and render the intermediate language data into print data in an optimum rendering process mode.

According to the second aspect of the invention, if the judging means judges that the data type of the input print information written with the predetermined page description language is image information, the converting means converts the image data in the print information into the intermediate language data after reducing the image information. Therefore, if the print information is image information, the total capacity of the intermediate language data of one page can be reduced.

According to the third aspect of the invention, if the total capacity of the intermediate language data exceeds the set capacity, the control means causes the rendering means to render the intermediate language data in the unit of a page. If the capacity of reduced intermediate data is still large, a page paint mode is used.

According to the fourth aspect of the present invention, if the total capacity of the intermediate language data does not exceed the set capacity, the control means causes the rendering means to render the intermediate language data in the unit of a predetermined band width. If the capacity of the reduced intermediate data is sufficiently small, the band rendering mode is used.

According to the fifth aspect of the present invention, if the control means causes the rendering means to render the intermediate language data in the unit of a page, the rendering means renders after enlarging the intermediate language data reduced by the converting means. Since the capacity of the storage means for storing image information can be reduced, a sufficient development capacity can be reserved in the storage means.

According to the sixth aspect of the present invention, the control means converts image information in the print information binarized through error diffusion into multivalue image data, changes the multivalue image data to low resolution, binarizes the multivalue image data of low resolution, and converts the binarized multivalue image data into the intermediate language data. It is therefore possible to suppress the quality of image information binarized through error diffusion from being degraded, as much as possible.

According to the seventh aspect of the present invention, upon a request of a reduction print of the input print information written with the predetermined page description language, the converting means converts image information in the print information binarized through error diffusion into multivalue image data, changes the multivalue image data to low resolution, binarizes the multivalue image data of low resolution, and converts the binarized multivalue image data into the intermediate language data. It is therefore possible to suppress the quality of image information binarized through error diffusion from being degraded during the reduction rendering.

According to the eighth aspect of the present invention, the data type of the print information is judged; if the data type of the print information is judged as image information, the image information is reduced; the reduced print information or the input print information is converted into predetermined intermediate language data; it is judged whether the total capacity of the converted intermediate language data exceeds a set capacity occupied by a rendering memory; the converted intermediate language data is rendered into print data in the unit of a page in accordance with the judgement results; and the converted intermediate language data is rendered into print data in the unit of a predetermined band width in accordance with the judgement results. It is therefore possible to generate intermediate language data having a different data amount in accordance with the data type of print information and render the intermediate language data into print data in an optimum rendering mode.

According to the ninth aspect of the present invention, if the image information is information binarized through error diffusion, the binarized image information is converted into multivalue image data, the multivalue image data is changed to low resolution, and the multivalue image data of low resolution is binarized. It is therefore possible to suppress the quality of an image binarized through error diffusion from being degraded during rendering.

According to the tenth aspect of the present invention, a medium storing a computer readable program is provided. With this program, the data type of the print information is judged; if the data type of the print information is judged as image information, the image information is reduced; the reduced print information or the input print information is converted into predetermined intermediate language data; it is judged whether the total capacity of the converted intermediate language data exceeds a set capacity occupied by a rendering memory; the converted intermediate language data is rendered into print data in the unit of a page in accordance with the judgement results; and the converted intermediate language data is rendered into print data in the unit of a predetermined band width in accordance with the judgement results. It is therefore possible to generate intermediate language data having a different data amount in accordance with the data type of print information and render the intermediate language data into print data in an optimum rendering mode.

As appreciated from the forgoing description, a rendering area of a memory resource in the unit of a band to be used by print information written with a predetermined page description language is suppressed as much as possible from not being reserved in the memory resource. A rendering process in the unit of a band can be executed as many times as possible to obtain a high quality print.

What is claimed is:

1. An output control apparatus comprising:
   input means for inputting at least one piece of print information;
   discrimination means for discriminating whether each of the at least one piece of print information, included in one page, input by said input means is of a predetermined data type;
   resolution processing means for decreasing a resolution of one of the at least one piece of print information included in the one page in response to said discrimination means discriminating that the one piece of print information is of the predetermined data type;
   conversion means for converting the at least one piece of print information included in the one page into intermediate language data;
   determining means for determining whether said conversion means has completed a conversion process for the one page; and
   rendering means for rendering print data based on the intermediate language data from said conversion means if said determining means determines that said conversion means has completed the conversion process for the one page.

2. An apparatus according to claim 1, wherein said rendering means enlarges the intermediate language data converted from the print information to render the print data.

3. An apparatus according to claim 2, wherein said rendering means enlarges the print information with decreased resolution and then performs the rendering on the enlarged print information.

4. An apparatus according to claim 1, wherein after said conversion means converts one page of the print information into intermediate language data, said rendering means performs the rendering on the one page of intermediate language data band by band.

5. An apparatus according to claim 1, wherein when an amount of the intermediate language data exceeds a predetermined level, said rendering means performs the rendering on the intermediate language data page by page.

6. A method of processing print information, said method comprising the steps of:
   inputting at least one piece of print information;
   discriminating whether each of the at least one piece of print information, included in one page, is of a predetermined data type;
   decreasing a resolution of the at least one piece of input print information included in the one page in response to discrimination in said discrimination step that the one piece of print information is of the predetermined data type;
   converting the at least one piece of print information included in the one page into intermediate language data;
   determining whether said converting step has completed a conversion process for the one page; and
   rendering print data based on the intermediate language data converted in said converting step if it is determined in said determining step that said converting step has completed the conversion process for the one page.

7. A method according to claim 6, wherein the rendering step includes enlarging the intermediate language data converted from the print information to render the print data.

8. A method according to claim 7, wherein said rendering step includes enlarging the print information with decreased resolution and then rendering the enlarged print information.

9. A method according to claim 6, wherein after one page of the print information is converted into intermediate language data in said converting step, the rendering step is performed on the one page of intermediate language data band by band.

10. A method according to claim 6, wherein when an amount of the intermediate language data exceeds a predetermined level, the rendering step is performed on the intermediate language data page by page.

11. A computer readable medium storing instructions for controlling an apparatus to process print information, execution of the instructions causing the apparatus to perform the steps of:
    inputting at least one piece of print information;
    discriminating whether each of the at least one piece of print information, included in one page, is of a predetermined data type;
    decreasing a resolution of the at least one piece of input print information included in the one page in response to discrimination in said discrimination step that the one piece of print information is of the predetermined data type;

converting the at least one piece of print information included in the one page into intermediate language data;

determining whether said converting step has completed a conversion process for the one page; and rendering print data based on the intermediate language data converted in said converting step if it is determined in said determining step that said converting step has completed the conversion process for the one page.

12. A medium according to claim 11, wherein after one page of the print information is converted into intermediate language data in said converting step, the rendering step is performed on the one page of intermediate language data band by band.

13. A medium according to claim 11, wherein when an amount of the intermediate language data exceeds a predetermined level, the rendering step is performed on the intermediate language data page by page.

14. A medium according to claim 11, wherein said rendering step includes enlarging the print information with decreased resolution and then rendering the enlarged print information.

* * * * *

UNITED STATES PATENT AND TRADEMARK OFFICE
CERTIFICATE OF CORRECTION

PATENT NO.     : 6,621,588 B1                                                          Page 1 of 1
DATED          : September 16, 2003
INVENTOR(S)    : Muneki Shimada It is certified that error appears in the above-identified patent and that said Letters Patent is hereby corrected as shown below:

<u>Column 12,</u>
Line 22, "of the at least one" should be deleted.

Signed and Sealed this

Tenth Day of February, 2004

JON W. DUDAS
*Acting Director of the United States Patent and Trademark Office*